Sept. 1, 1936. H. KUEHLING 2,053,197
TAKE-UP BEARING
Filed Jan. 7, 1933 2 Sheets-Sheet 2
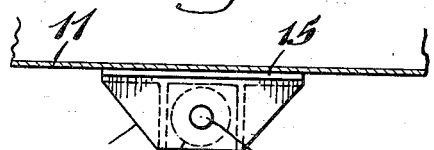
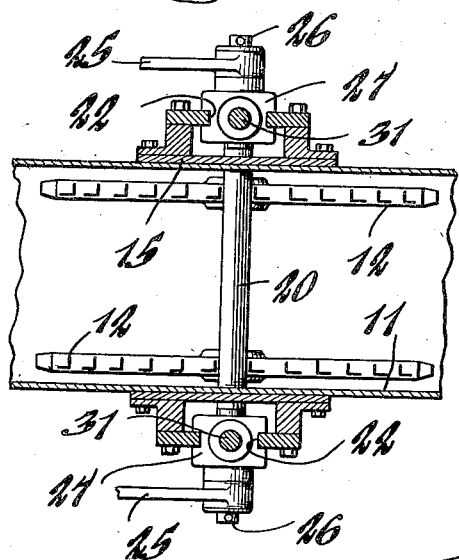
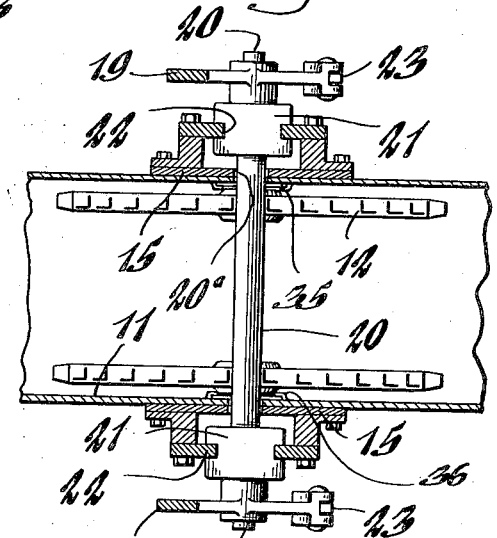
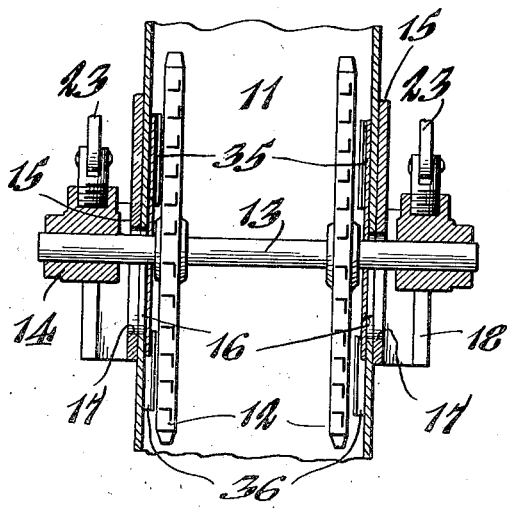
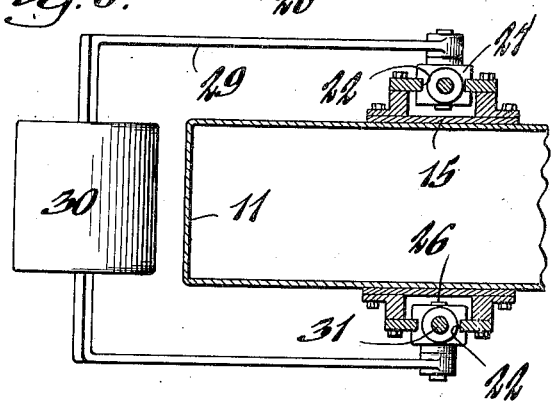
Inventor,
Herman Kuehling,
by Walter P. Geyer
Attorney.

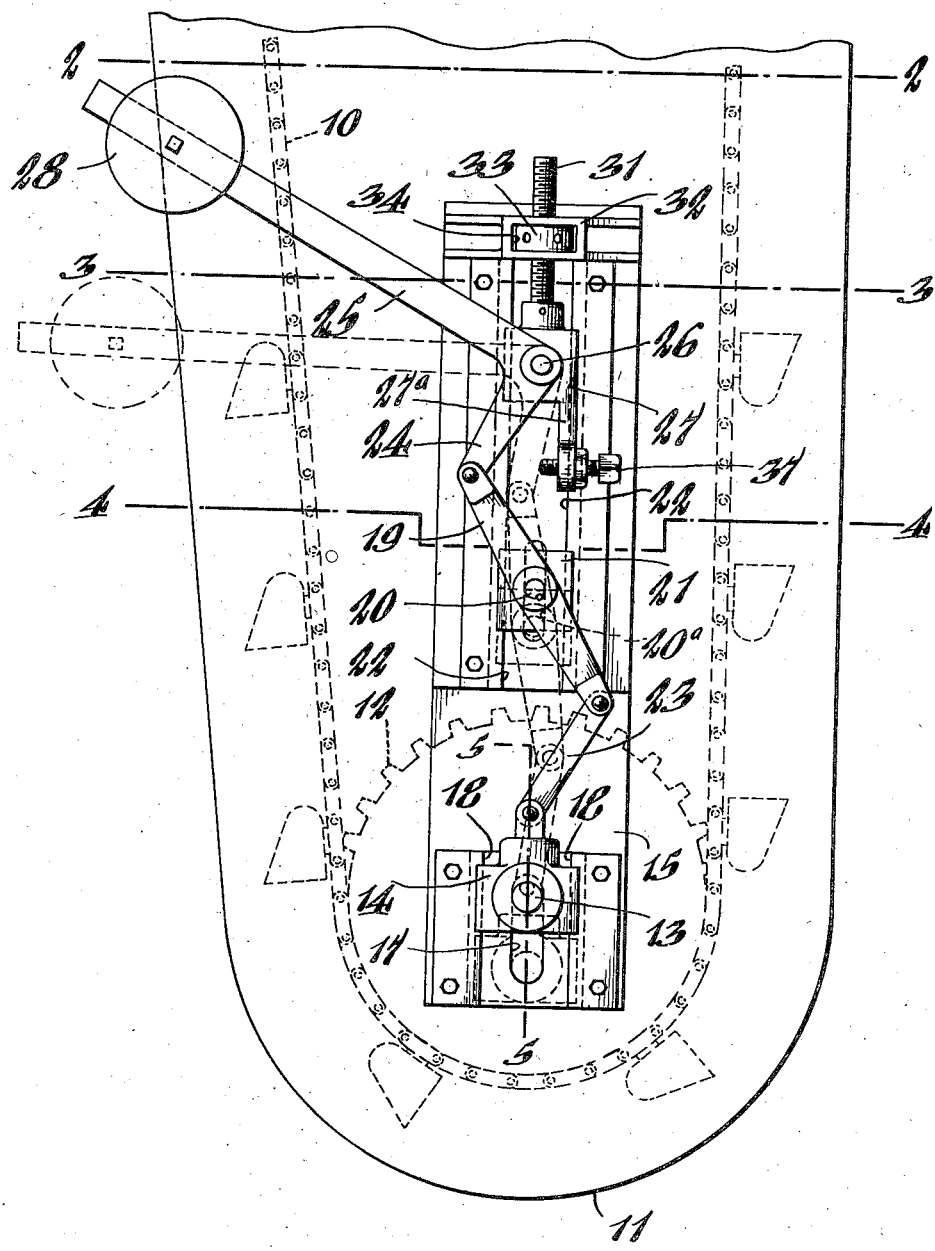

Patented Sept. 1, 1936

2,053,197

UNITED STATES PATENT OFFICE 2,053,197

TAKE-UP BEARING

Herman Kuehling, Snyder, N. Y., assignor to The Barber Asphalt Company, Philadelphia, Pa., a corporation of Virginia Application January 7, 1933, Serial No. 650,700

12 Claims. (Cl. 308—60)

This invention relates to certain new and useful improvements in take-up devices for the bearings of conveyor belts, elevators, driving belts and like equipment.

One of its objects is the provision of a take-up mechanism of this character which will automatically effect an adjustment of the bearings to maintain the conveyor belt or the like in proper operation at all times irrespective of any change in its length caused by differences in temperature or to stretching or wear of the belt.

Another object of the invention is to provide a take-up for the bearings of conveyor belts and the like which is simple, compact and inexpensive in construction, reliable, automatic and efficient in operation, and which is so designed as to be flexible and have a maximum capacity of take-up, rendering it particularly adaptable for use on conveyor or elevator systems employed in the handling of hot materials.

In the accompanying drawings:—Figure 1 is a side elevation of a portion of an elevator casing or housing showing my invention applied thereto. Figure 2 is a fragmentary horizontal section taken in the plane of line 2—2, Figure 1. Figure 3 is a horizontal section taken on line 3—3, Figure 1. Figure 4 is a horizontal section taken on line 4—4, Figure 1. Figure 5 is a fragmentary vertical section taken in line 5—5, Figure 1. Figure 6 is a horizontal section, similar to Figure 3, showing a slightly modified form of the invention.

Similar characters of reference indicate corresponding parts throughout the several views.

By way of example, I have shown my invention in connection with a conveyor belt or elevator 10 housed within a boot or casing 11 and passing at its lower end around one or more pulleys or sprocket wheels 12 mounted on a transverse shaft 13 supported at its ends in suitable bearings 14, preferably disposed on the exterior of the casing.

Attached to the outside of the elevator casing 11 are bearing-supporting plates 15 relative to which the bearings 14 are movable in a direction lengthwise of the casing or in a direction substantially parallel to that of the belt travel. For this purpose the casing and the plates attached thereto are provided with alining or registering slots or openings 16, 17 through which the belt or chain-supporting shaft 13 passes, as seen in Figure 5, and said plates have guides 18 on which the bearings 14 are free to slide in accordance with the contraction or expansion of the belt or chain.

The means for automatically transmitting longitudinal movement to the shaft-bearings 14, to compensate for any variation in the length of the belt or chain due to temperature differences or otherwise and thereby maintain the belt or chain in proper operation at all times, preferably consists of a toggle mechanism comprising one or more pairs of vertically-swinging levers 19 disposed above the companion bearings 14 and keyed or otherwise fixed in alining relation upon the ends of a transverse pivot element or rock shaft 20 journaled at its ends in companion, vertically-slidable blocks or cross-heads 21 guided in suitable rails 22 applied to the plates 15. The slidable blocks or cross heads 21 form a movable support for the pivot element or rock shaft 20. At its lower end each lever 19 is pivotally connected by a link 23 with the companion shaft-bearing 14 while its upper end is similarly connected to the short arm 24 of a bell crank lever 25 fulcrumed at 26 on a vertically-adjustable block 27 guided on the rails 22. The ends of the shaft 20 extend through corresponding alining slots 20ª formed in the side walls of the casing 11 and plates 15. The long arm of this bell crank is provided with an adjustable weight 28 for actuating the toggle mechanism to shift the respective bearings in a direction to take up any slack or expansion in the conveyor belt. By mounting the levers 19 in this manner, they are caused to swing in unison and uniformly transmit movement to the bearings 14 to equalize the pull on the respective chain or chains and maintain the shaft 13 in proper alinement. If desired, the bell crank levers 25 may be connected at their outer ends to a tie bar 29 and a weight 30 applied thereto as seen in Figure 6.

Each of the vertically-adjustable blocks 27 on which the bell crank levers 25 are fulcrumed has a screw-stem 31 rising therefrom which passes freely through a bracket 32 applied to the upper end of each plate 15 and has a nut 33 mounted thereon and seated in a recess 34 formed in the bracket, whereby axial movement of the nut relative to the screw-stem is prevented. By turning the nut in one direction or the other, the corresponding block 27 is shifted accordingly to change the angle of the toggle connection, varying the force applied to the bearing 14 and correspondingly shifting the bearing, thereby properly adjusting the conveyor belt or chain and maintaining it taut.

This improved mechanism is particularly applicable to conveyor and like systems where hot materials are handled and where the conveyor belts or chains and the like are subject to expansion and contraction, my invention operating to automatically compensate for any variation in the length of the belt, chain or the like to insure proper and efficient operation of the elevator. In use, any increase in the length of the elevator belt or chain, due for example to its expansion in the presence of heat, will be automatically corrected by shifting the bearings 14 outwardly, the weights 28 exerting the power to constantly force the toggle mechanism in a direction to move said bearings away from the bell-crank carrying blocks 27. On the other hand, should the elevator belt or chain contract or become shortened through change in temperature conditions, the bearings 14 will move inwardly toward the blocks 27 against the resistance offered by the weights 28, and thereby relieve the contraction and avoid breakage of the belt or chain, as is the case when the sprocket is held by the shaft in fixed bearings. When the conveyor belt stretches as the result of wear, the bearings 14 are properly adjusted to compensate for such increase in wear by merely shifting the blocks 27 in the proper direction through the medium of the adjusting nuts 33.

For the purpose of protecting the bearings 14 against dust and other foreign matter which may be present in the material being handled, I preferably cover the shaft-openings 16, 17 with cover plates or shields 35 which are carried by and move vertically with the shaft 13 and are guided in suitable ways 36 applied to the inside wall of the elevator-casing 11. In order to limit the swinging of the toggle connection beyond a predetermined point, I preferably provide a stop 37 which may be disposed in the path of movement of the arm 24 of the bell crank lever 25, as shown in Figure 1. As depicted in said figure, this stop may be in the form of an adjusting screw or bolt applied to a depending arm or bracket 27a on the bearing block 27.

I claim as my invention:—

1. A take-up bearing including in combination a movably mounted bearing, a lever one arm of which is weighted, a second lever fulcrumed on a slidable member, a link connecting said second lever with said bearing, and means connecting said levers.

2. A take-up bearing including in combination a bearing movable at right angles to its axis, a lever one arm of which is weighted, a member movable in line with said bearing, a second lever fulcrumed on said member, a link connecting said second lever with said bearing, and means connecting said levers.

3. A take-up bearing including in combination a bearing movable at right angles to its axis, a lever one arm of which is weighted, a member movable in line with said bearing, a second lever fulcrumed intermediate its ends on said member, a link connecting one end of said second lever with said bearing, and means connecting the other end of said second lever with an unweighted arm of said first lever.

4. A take-up bearing including in combination a bearing movable at right angles to its axis, a lever one arm of which is weighted, a second lever having a fulcrum movable in line with said bearing, a link connecting said lever with said bearing, and means for adjusting the position of said first mentioned lever relative to said second mentioned lever.

5. In a device of the character described, the combination of a shaft, movable bearings for the opposite ends of said shaft, members spaced from said bearings in normally fixed relation thereto, slidable blocks interposed between said bearings and said normally-fixed members, a rock shaft journaled in said blocks, levers fixed on the outer ends of said rock shaft, links connecting one end of said levers with said bearings, and means fulcrumed on said relatively-fixed members and operatively connected to the other ends of said levers for actuating the same to shift the bearings toward and from said members.

6. A device of the character described, comprising a casing having alining openings therein, bearings slidably mounted on the exterior of said casing in the direction of said openings, a chain-engaging shaft extending through said casing-openings and journaled in said bearings, means connected to said bearings adapted to automatically move said bearings to take up any slack in the chain, and dust-shields applied to said shaft and covering the openings in said casing.

7. In a device of the character described, the combination of a movable bearing, a member spaced from said bearing in normally fixed relation thereto, a toggle mechanism disposed between said bearing and said relatively spaced member and including means for automatically actuating said mechanism to move the bearing relative to said spaced member, and a bracket carried by said member and having an adjustable stop thereon and adapted to prevent said toggle mechanism from assuming a dead center position.

8. In a device of the character described the combination of a movable bearing, a member spaced from said bearing in normally fixed relation thereto and a toggle mechanism disposed between said bearing and said relatively spaced member, said toggle mechanism including a lever fulcrumed on a slidable member and means for automatically actuating said mechanism to move the bearing relative to said spaced member.

9. In a device of the character described the combination of a movable bearing, a member spaced from said bearing in normally fixed relation thereto and a toggle mechanism disposed between said bearing and said relatively spaced member, and including a lever fulcrumed on a movable member, means for controlling the path of movement of said member and means for automatically actuating said mechanism to move the bearing relative to said spaced member.

10. A take-up bearing including in combination a bearing movable at right angles to its axis, a lever one arm of which is weighted, a slidable member, a second lever fulcrumed on said slidable member, a link connecting said second lever with said bearing and means connecting said levers.

11. In a device of the character described, the combination of a shaft, movable bearings for the opposite ends of said shaft, members spaced from said bearings in normally fixed relation thereto, slidable blocks interposed between said bearings and said normally fixed members, a rock shaft journaled in said blocks, levers fixed on the outer ends of said rock shaft, links connecting one end of said levers with said bearings and means fulcrumed on one of said fixed members and operatively connected to the other end of one of said levers for actuating the same to shift the bearings toward and from said members.

12. In a device of the character described, the combination of a movable bearing, a member spaced from said bearing in normally fixed relation thereto, a toggle mechanism disposed between said bearing and said relatively spaced member and including means for automatically actuating said mechanism to move the bearing relative to said spaced member and a stop carried by said member and adapted to prevent said toggle mechanism from assuming a dead center position.

HERMAN KUEHLING.